United States Patent
Iwata

(10) Patent No.: US 7,192,193 B2
(45) Date of Patent: Mar. 20, 2007

(54) MULTILAYER SLIDING MEMBER

(75) Inventor: Hideki Iwata, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 135 days.

(21) Appl. No.: 10/984,887

(22) Filed: Nov. 10, 2004

(65) Prior Publication Data

US 2006/0062503 A1  Mar. 23, 2006

(30) Foreign Application Priority Data

Dec. 4, 2003  (JP)  ............. 2003-405598

(51) Int. Cl.
*F16C 33/20* (2006.01)
(52) U.S. Cl. ...................... 384/297; 384/909
(58) Field of Classification Search ........ 384/297–300, 384/908, 909
See application file for complete search history.

(56) References Cited

U.S. PATENT DOCUMENTS 4,703,076 A * 10/1987 Mori .......................... 524/420

2005/0249964 A1* 11/2005 Nakajima et al. ........... 384/909

FOREIGN PATENT DOCUMENTS

| JP | 2001-132756 | 5/2001 |
| JP | 2001-355634 | 12/2001 |

* cited by examiner

*Primary Examiner*—Thomas R. Hannon
(74) *Attorney, Agent, or Firm*—Browdy and Neimark, PLLC

(57) ABSTRACT

There is provided a sliding member having excellent frictional wear properties not only under non-lubrication and under oil-lubrication but also under boundary lubrication. The present invention provides a multilayer sliding member including a porous metal layer formed on a sheet of back metal and a resin layer impregnated into and coated on the porous metal layer, wherein the above described resin layer contains 1 to 25 vol % of an oxybenzoyl polyester resin, 0.1 to 5 vol % of a hard particle material, 1 to 5 vol % of an inorganic compound, and polytetrafluoroethylene. Particularly, the addition of the inorganic compound enhances the oil-retention property under boundary lubrication, so that the frictional wear properties under boundary lubrication can be improved pronouncedly.

20 Claims, No Drawings

MULTILAYER SLIDING MEMBER

BACKGROUND OF THE INVENTION

The present invention relates to a multilayer sliding member comprising a porous metal layer formed on a back metal and a resin layer impregnated into and coated on the porous metal layer, and to a multilayer sliding member having excellent frictional wear properties not only when used under lubrication or non-lubrication but also when used under boundary lubrication.

PRIOR ART

Polytetrafluoroethylene resin has hitherto been widely used for sliding members such as bearings because polytetrafluoroethylene resin is excellent in self-lubricating property and low in friction coefficient, and additionally, has heat resistance and chemical resistance.

A sliding member coated with polytetrafluoroethylene resin alone is poor in abrasion resistance. Thus, according to the intended purpose of application of the sliding member, the following components are added to cover this shortcoming: another resin excellent in mechanical properties as filler, a low-melting material such as lead or a lead alloy, and a solid lubricant excellent in lubricating property such as graphite or molybdenum disulfide. However, a sliding member including lead or a lead alloy is environmentally problematic, and hence in these years, there have been proposed a large number of sliding members including other resins, other solid lubricants, hard particle materials and the like in place of lead or a lead alloy. For example, in JP-A-2001-355634 (patent document 1) previously filed by the present applicant, a sliding member is proposed which includes tetrafluoroethylene-fluoroalkyl vinyl ether copolymer resin (hereinafter abbreviated as "PFA") and oxybenzoyl polyester resin as other resins, and a ceramic particle material as a hard particle material. Furthermore, in JP-A-2001-132756 (patent document 2), a sliding member is disclosed which includes stannic oxide as a hard particle material.

The aforementioned various types of sliding members each display a certain degree of frictional wear properties under ordinary conditions, for example, under non-lubrications or under oil-lubrication conditions. However, there has been a problem such that the performance can hardly be said to be sufficient particularly under boundary lubrication with high load.

The present invention has been achieved in view of the above described problems, and takes as its object the provision of a sliding member having excellent frictional wear properties not only under non-lubrications or under oil-lubrication conditions but also under boundary lubrication.

SUMMARY OF THE INVENTION

According to the present invention, the following sliding members are provided.
(1) A multilayer sliding member comprising a porous metal layer formed on a back metal and a resin layer impregnated into and coated on the porous metal layer,.wherein the resin layer comprises 1 to 25 vol % of oxybenzoyl polyester resin, 0.1 to 5 vol % of a hard particle material, 1 to 5 vol % of an inorganic compound, and polytetrafluoroethylene.
(2) The multilayer sliding member according to aspect (1) wherein the resin layer further includes 1 to 15 vol % of tetrafluoroethylene-fluoroalkyl vinyl ether copolymer resin.
(3) The multilayer sliding member according to aspect (1) or (2) wherein the resin layer further contains 1 to 10 vol % of graphite and/or molybdenum disulfide.
(4) The multilayer sliding member according to aspect (1), (2) or (3) wherein the hard particle material is stannic oxide.
(5) The multilayer sliding member according to aspect (1), (2), (3) or (4) wherein the inorganic compound is calcium carbonate.
(6) The multilayer sliding member according to aspect (5) wherein the specific surface area of the calcium carbonate is 2 $m^2/g$ or more.

DETAILED DESCRIPTION OF THE INVENTION

In aspect (1) of the present invention, the resin layer of the multilayer sliding member comprises polytetrafluoroethylene resin (hereinafter abbreviated as "PTFE"), as the main component, 1 to 25 vol % of oxybenzoyl polyester resin (hereinafter abbreviated as "POB"), 0.1 to 5 vol % of a hard particle material and 1 to 5 vol % of an inorganic compound. POB is higher in hardness than the main component PTFE, and is hardly decomposable at the melting point of PTFE or above, and displays an effect of improving the abrasion resistance under a condition such that an appropriate amount of POB is dispersed in the resin layer. It is necessary that the content of PBO be 1 to 25 vol %, preferably 5 to 20 vol %; when the content is smaller than 1 vol %, no sufficient abrasion resistance can be obtained, while when the content exceeds 25 vol % the structure of PTFE as the base resin is embrittled, the abrasion resistance being thereby degraded.

The addition of a hard particle material results in dispersing particles with higher hardness (6 or higher in Mohs hardness) on the sliding surface, and displays thereby an effect of further improving the abrasion resistance. It is necessary that the content of the hard particle material be 0.1 to 5 vol %, and it is desirable that the content of the hard particle material be preferably 0.5 to 2.5 vol %. This is because with the content smaller than 0.1 vol %, no sufficient abrasion resistance can be obtained, and with the content exceeding 5 vol %, the counterpart shaft is attacked, and adversely the abrasion resistance is degraded. Incidentally, examples of the hard particle material include ceramics, metals, metal oxides, metal compounds, carbonized phenolic resins; in particular, when stannic oxide, which is a metal oxide, is adopted as the hard particle material (aspect (4)), there is found a function to drastically improve the abrasion resistance of PTFE; and in this case, it is desirable that the average particle size be 5 μm or less, preferably 1 to 3 μm.

The addition of an inorganic compound can achieve the improvement of the frictional wear properties under boundary lubrication, the property concerned being the most prominent feature of the present invention. It is necessary that the content of the inorganic compound be 1 to 5 vol %, and it is desirable that the content of the inorganic compound be preferably 1.5 to 4 vol %. This is because with the content smaller than 1 vol %, no sufficient abrasion resistance can be obtained under non-lubrication and under boundary lubrication, and with the content exceeding 5 vol %, the abrasion resistance is degraded under oil-lubrication. Incidentally, examples of the inorganic compound include salts such as phosphates, carbonates, silicates and sulfates; in particular, when calcium carbonate is adopted as the inorganic compound (aspect (5)), it is possible that the oil-retention property under boundary lubrication can be improved, so that a drastic improvement of the frictional wear properties under boundary lubrication can be strived for; and in this case, by making the specific surface area of calcium carbonate be 2 m$^2$/g or more (aspect (6)), a sliding property can be attained not only under non-lubrication and/or under oil-lubrication but also even under boundary lubrication because a sufficient oil-retention property is ensured.

In aspect (2) of the present invention, the resin layer further includes 1 to 15 vol % of tetrafluoroethylene-fluoroalkyl vinyl ether copolymer (hereinafter abbreviated as "PFA"); PFA is blended with PTFE to form a polymer alloy, and displays an effect of increasing the hardness of the composition thus obtained as compared to the hardness of PTFE alone. In this connection, the reason for selecting PFA is that PFA is higher in hardness than other fluororesins (for example, tetrafluoroethylene-hexafluoropropylene copolymer resin, hereinafter abbreviated as "FEP"); moreover, the melting point of PFA is close to that of PTFE, and PFA is excellent in thermal decomposition stability. More specifically, the melting point of PTFE is 327° C., the melting point of PFA is 300 to 310° C., and the melting point of FEP is 250 to 280° C. In order to blend PFA with PTFE, it is necessary to heat to 327° C., the melting point of PTFE, or above; FEP having a lower melting point probably undergoes decomposition and the like at 327° C. or above. On the contrary, the melting point of PFA is close to that of PTFE, and hence it is possible to blend PFA with PTFE without decomposing PFA. It is necessary that the content of PFA be 1 to 15 vol %; with the content less than 1%, no effect of increasing the hardness can be obtained, and with the content exceeding 15 vol %, the friction properties is degraded.

Furthermore, in aspect (3) of the present invention, the resin layer further includes 1 to 10 vol % of graphite or/and molybdenum disulfide; the addition of a solid lubricant such as graphite, molybdenum disulfide or the like makes it possible to improve the self-lubricating property and to further improve the low friction properties. Additionally, it is necessary that the content of the solid lubricant be 1 to 10 vol %; with the content less than 1 vol %, no effect of improving the friction properties can be obtained, and with the content exceeding 10 vol %, the structure of PTFE as the base resin is embrittled and the abrasion resistance is degraded.

PREFERRED EMBODIMENTS OF THE INVENTION

Description will be made below on embodiments in which the present invention was applied to a material for a sliding bearing. This bearing is a so-called cylindrical bearing called a bush, and was formed as follows: a porous sintered metal layer made of a copper based alloy was arranged on the surface side (the inner circumference side) of a sheet of back metal made of a metal plate of steel (a low-carbon steel for general structure), through the intermediary of a copper-plated layer to enhance the bonding property; and furthermore, a resin layer as will be described later, involved in the present embodiment, was impregnated into the interior of the porous sintered metal layer and coated on the surface of the porous sintered metal layer.

The resin layer was constituted with PTFE as the main component, and had the component compositions of Examples 1 to 4 shown in subsequent Table 2. In this connection, for the hard particle material, stannic oxide (SnO$_2$) having a Mohs hardness of 7 was adopted, the average particle size thereof being 1 µm. Furthermore, in addition to the above described compositions, tetrafluoroethylene-fluoroalkyl vinyl ether copolymer resin (in Table 2, abbreviated as "PFA") may be added as a fluororesin, and graphite (in Table 2, abbreviated as "Gr") may be added as a solid lubricant. The average particle size of this solid lubricant is 10 µm.

A brief description will be now made of a fabrication method of the above described bearing. First, a copper alloy powder was spread to a thickness of 0.3 mm over a sheet of steel (a sheet of back metal) 1.2 mm thick having a copper-plated surface thereon; then, the sheet of steel was heated at a temperature from 750 to 900° C. in a reducing atmosphere to sinter the copper alloy powder. Thus, a porous sintered metal layer was obtained on the sheet of back metal (the copper-plated layer).

On the other hand, there was carried out a step for obtaining a mixture composed of the materials constituting the resin layer. In this case, a POB powder, a hard particle material, an inorganic compound, and according to need, a predetermined amount of a PFA powder and a solid lubricant powder were added to a predetermined amount of PTFE, and all these ingredients were mixed together homogeneously to obtain the mixture. Then, the mixture was impregnated into and coated on the porous sintered metal layer on the sheet of the back metal, subsequently a multilayered material was cured at a temperature of 350 to 400° C., and subsequently the thickness thereof was uniformized by rolling. Consequently, there is obtained the flat multilayered material in which a resin layer was impregnated into the porous sintered metal layer on the sheet of the back metal. Thereafter, the material was cut to required dimensions and the material piece thus obtained was subjected to bending processing (wrapping processing) to fabricate a cylindrical bearing (a bush).

A bearing constructed in this way was made to support a shaft made of a steel on the inner-circumferential sliding surface (a resin layer surface).

Next, for the purpose of verifying and confirming the effectiveness of the bearing fabricated as described above, the bearings respectively having the resin layers of the compositions of Examples 1 to 4, and the bearings respectively having the resin layers of the compositions of Comparative Examples 1 and 2 were subjected to a frictional wear test to examine the abrasion losses and the friction coefficients of these bearings. The frictional wear test was carried out under the conditions shown in Table 1. The test conditions were low-speed and high-load conditions, reproduced the situation under so-called boundary lubrication such that an oil film was hardly formed, and the viscosity of the used oil was low, so that the counterpart shaft and the bearing were able to be easily in contact with each other. For the shaft, a material obtained by quenching S55C steel (the surface roughness, the hardness and the like thereof are shown in Table 1) was used. The results of this frictional wear test are shown in Table 2, along with the component compositions. Incidentally, when under the conditions shown in Table 1, an experiment was carried out with a bearing in which 15 vol % of a lead alloy (a lead-tin alloy) powder was added to PFTE as a component of the resin layer, seizure was occurred, and hence neither abrasion loss nor friction coefficient was able to be measured. In other words, 5 the conditions shown in Table 1 show severe test conditions under boundary lubrication.

TABLE 1

|  | Test conditions | Unit |
|---|---|---|
| Dimensions | Outside diameter 23 × Inside diameter 20 × Length 20 | mm |
| Speed | 3 | m/min |
| Specific load | 20 | MPa |
| Lubricating oil | Equivalent of SAE#10 | — |
| Supply of lubricating oil | 0.15 | cm$^3$/min |
| Shaft material | JIS S55C (quenched) | — |
| Hardness | 500–700 | H$_v$ |
| Roughness | not more than 1.5 | R$_y$ μm |
| Time | 100 | h |

TABLE 2

| | | Composition (vol %) | | | | | | | | | Test results | |
|---|---|---|---|---|---|---|---|---|---|---|---|---|
| | | Fluororesin | | Hard particle material | | Inorganic compound | | Abrasion resistant material | Solid lubricant | | | |
| | No. | PTFE | PFA | SnO$_2$ | Al$_2$O$_3$ | CaCO$_3$ 3.0 (m$^2$/g) | CaCO$_3$ 1.7 (m$^2$/g) | POB | CF | Gr | Abrasion loss (μm) | Friction coefficient |
| Comparative | 1 | Balance | | 3 | | | | | 10 | | 13 | 0.009 |
| Example | 2 | Balance | 15 | | 3 | | | 15 | | 5 | 7 | 0.010 |
| Example | 1 | Balance | | 1 | | 3 | | 10 | | | 6 | 0.008 |
| | 2 | Balance | 10 | 1 | | 3 | | 10 | | | 4 | 0.009 |
| | 3 | Balance | 10 | 1 | | | 3 | 10 | | 5 | 4 | 0.007 |
| | 4 | Balance | 10 | 1 | | 3 | | 10 | | 5 | 3 | 0.003 |

Brief description is made on Comparative Examples 1 and 2, and Examples 1 to 4 shown in Table 2. Comparative Example 1 is an embodiment article included within the scope of the inventive aspect according to claim 2 of the above described patent document 2, and is constituted as a bearing having a resin layer subjected to impregnation and coating which layer is made of PTFE mixed with 3 vol % of stannic oxide (SnO$_2$) as a hard particle material and 10 vol % of carbon fiber (CF) as an abrasive resistant material. Comparative Example 2 is an embodiment article included within the scope of the inventive aspect according to claim 2 of the above described patent document 1, and is constituted as a bearing having a resin layer subjected to impregnation and coating which layer is made of PTFE mixed with 15 vol % of tertrafluoroethylene-fluoroalkyl vinyl ether copolymer (PFA), 3 vol % of alumina (A$_2$O$_3$) as a hard particle material, 15 vol % of oxybenzoyl polyester resin (POB) and 5 vol % of graphite (Gr) as a solid lubricant.

On the other hand, Example 1 is an embodiment article regarding aspect (1) of the present application, and is constituted as a bearing having a resin layer subjected to impregnation and coating which layer is made of PTFE mixed with 10 vol % of POB, 1 vol % of SnO$_2$ as a hard particle material, and 3 vol % of calcium carbonate (CaCO$_3$) as an inorganic compound. In this case, there is used CaCO$_3$ (manufactured by Maruo Calcium Co., Ltd., NANOX #30) having a specific surface area of 3 m$^2$/g and an average particle size of 1.1 μm.

Example 2 is an embodiment article involved in aspect (2) of the present application, and is constituted as a bearing having a resin layer subjected to impregnation and coating which layer is made of PTFE mixed with 10 vol % of POB, 1 vol % of SnO$_2$ as a hard particle material, 3 vol % of calcium carbonate (CaCO$_3$) as an inorganic compound, and additionally 10 vol % of PFA. Also in this case, there is used the same CaCO$_3$ (manufactured by Maruo Calcium Co., Ltd., NANOX #30) having a specific surface area of 3 m$^2$/g and an average particle size of 1.1 μm, which complies with the requirement of aspect (6).

Example 3 is an embodiment article involved in aspect (3) of the present application, and is constituted as a bearing having a resin layer subjected to impregnation and coating which layer is made of PTFE mixed with 10 vol % of POB, 1 vol % of SnO$_2$ as a hard particle material, 3 vol % of calcium carbonate (CaCO$_3$) as an inorganic compound, and additionally 10 vol % of PFA and 5 vol % of graphite (Gr) as a solid lubricant. Also in this case, there is used CaCO$_3$ (manufactured by Maruo Calcium Co., Ltd., SUPER #1700) having a specific surface area of 1.7 m$^2$/g and an average particle size of 1.3 μm, which does not comply with the requirement of aspect (6).

Example 4 is an embodiment article involved in aspect (3) of the present application, and is constituted as a bearing having a resin layer subjected to impregnation and coating which layer is made of PTFE mixed with 10 vol % of POB, 1 vol % of SnO$_2$ as a hard particle material, 3 vol % of calcium carbonate (CaCO$_3$) as an inorganic compound, and additionally 10 vol % of PFA and 5 vol % of graphite (Gr) as a solid lubricant. In this case, there is used CaCO$_3$ (manufactured by Maruo Calcium Co., Ltd., NANOX #30) having a specific surface area of 3 m$^2$/g and an average particle size of 1.1 μm, which complies with of aspect (6).

According to the results of the frictional wear test, in all Examples 1 to 4, there have been obtained excellent sliding members-such that the inside diameter variations (abrasion losses) thereof are equal to or less than half that of Comparative Example 1 which is an embodiment article of patent document 2, and the friction coefficients thereof are equivalent to or less than that of Comparative Example 1, the abrasion resistances thereof and the friction properties thereof are excellent under boundary lubrication. Additionally, in all Examples 1 to 4, there have been obtained excellent sliding members such that the inside diameter variations (abrasion losses) thereof and the friction coefficients thereof are all equivalent or less than that of Comparative Example 2 which is an embodiment article of patent document 1, and the abrasion resistances thereof and the friction properties thereof are excellent under boundary lubrication. In particular, in comparison of Examples 1 to 4 with Comparative Example 2, a most significant difference in composition is such that Examples 1 to 4 include $CaCO_3$, an inorganic compound, but Comparative Example 2 does not include any inorganic compound. Consequently, the inclusion of $CaCO_3$, an inorganic compound, in the resin layer is found to improve the frictional wear properties under boundary lubrication. This is probably because $CaCO_3$, an inorganic compound, displays an effect of improving the oil-retention property under boundary lubrication.

Next, description is made on a mutual comparison between Examples. A comparison between Example 1 and Example 2 shows that the abrasion loss in Example 2 is remarkably decreased; this is probably because PFA is not included in Example 1, but PFA is included in Example 2, so that PFA is blended with PTFE to form a polymer alloy, and an effect of improving the hardness of the composition as compared to the hardness obtained by PTFE alone is thereby displayed, drastically improving the abrasion resistance of Example 2. Additionally, a comparison between Example 2 and Example 3 shows that the abrasion loss of Example 3 is the same as that of Example 2, but the friction coefficient of Example 3 is slightly smaller than that of Example 2. This is probably because the solid lubricant included in Example 3, namely, Gr can improve the self-lubricating property, and the low friction properties is thereby further improved. Yet additionally, a comparison between Example 3 and Example 4 shows that the abrasion loss of Example 4 is slightly smaller than that of Example 3, but the friction coefficient of Example 4 is drastically smaller than that of Example 3, the difference degree in friction coefficient being much larger than that in abrasion loss. This is probably because although the same amount of an inorganic compound is included both in Example 3 and in Example 4, the inorganic compound material in Example 4, larger in specific surface area than that in Example 3, has a sufficient oil-retention property, so that an excellent sliding property can be obtained under boundary lubrication. Incidentally, it has been experimentally confirmed that when the specific surface area is 2 $m^2$/g or more, the associated sliding property is remarkably improved. Additionally, for the cases where the specific surface area is 2 $m^2$/g or more, a measurement of the upper limit of the specific surface area was tried; however, the highest commercially available value of the specific surface area of $CaCO_3$ amounts to 3.5 $m^2$/g, and it has been able to experimentally confirm that by using such a sample of $CaCO_3$, the sliding property can be remarkably improved. Accordingly, in the present invention, the range of the specific surface area of calcium carbonate can hardly be specified; however, as affairs stand, the range concerned probably fall within the range from 2 to 3.5 $m^2$/g.

As described above, according to the sliding member having a resin layer provided with a component composition of the present invention, when PTFE is the main component, there can be obtained an unprecedented, excellent frictional wear properties under boundary lubrication.

In the above described embodiment, there have been shown cases where the present invention is applied to the bush supporting the shaft; however, the present invention can also be applied to the sliding members to be used under boundary lubrication, wherein bearings are not limited to bushes, but the present invention can be applied to thrust washers, sliding plates and the like. Additionally, without limiting to cases of boundary lubrication, the present invention can be applied to cases of non-lubrication, oil-lubrication and the use in a liquid such as water without causing inconvenience.

Additionally, the present invention is not limited to the above described embodiment, but can be modified within the scope of the gist of the present invention in such a way that: for example, as a hard particle material, other ceramic hard particle materials such as $Cr_2O_3$ and $SiO_2$ may be adopted, and two or more thereof may be used in combination; additionally, as for the solid lubricant, BN, $WS_2$ and the like can be used; and yet additionally, the materials for the back metal and the porous metal layer and the materials for the counterpart members (shafts) and the like are not limited in quality to the above described materials.

The invention claimed is:

1. A multilayer sliding member comprising a porous metal layer formed on a back metal and a resin layer impregnated into and coated on said porous metal layer, wherein said resin layer comprises 1 to 25 vol % of an oxybenzoyl polyester resin, 0.1 to 5 vol % of a hard particle material, 1 to 5 vol % of calcium carbonate, and polytetrafluoroethylene.

2. The multilayer sliding member according to claim 1, wherein the specific surface area of said calcium carbonate is 2 $m^2$/g or more 17.

3. The multilayer sliding member according to claim 1, wherein said hard particle material is stannic oxide.

4. The multilayer sliding member according to claim 3, wherein the specific surface area of said calcium carbonate is 2 $m^2$/g or more.

5. The multilayer sliding member according to claim 1, wherein said resin layer further contains 1 to 10 vol % of graphite and/or molybdenum disulfide.

6. The multilayer sliding member according to claim 5, wherein the specific surface area of said calcium carbonate is 2 $m^2$/g or more.

7. The multilayer sliding member according to claim 5, wherein said hard particle material is stannic oxide.

8. The multilayer sliding member according to claim 7, wherein the specific surface area of said calcium carbonate is 2 $m^2$/g or more.

9. The multilayer sliding member according to claim 1, wherein said resin layer further contains 1 to 15 vol % of tetrafluoroethylene-fluoroalkyl vinyl ether copolymer resin.

10. The multilayer sliding member according to claim 9, wherein the specific surface area of said calcium carbonate is 2 $m^2$/g or more.

11. The multilayer sliding member according to claim 9, wherein said hard particle material is stannic oxide.

12. The multilayer sliding member according to claim 11, wherein the specific surface area of said calcium carbonate is 2 $m^2$/g or more.

13. The multilayer sliding member according to claim 9, wherein said resin layer further contains 1 to 10 vol % of graphite and/or molybdenum disulfide.

14. The multilayer sliding member according to claim 13, wherein the specific surface area of said calcium carbonate is 2 $m^2$/g or more.

15. The multilayer sliding member according to claim 13, wherein said hard particle material is stannic oxide.

16. The multilayer sliding member according to claim 15, wherein the specific surface area of said calcium carbonate is 2 $m^2$/g or more.

17. A multilayer sliding member comprising a porous metal layer formed on a back metal and a resin layer impregnated into and coated on said porous metal layer, wherein said resin layer comprises 1 to 25 vol % of an oxybenzoyl polyester resin, 0.1 to 5 vol % of a hard particle material of stannic oxide, 1 to 5 vol % of an inorganic compound, and polytetrafluoroethylene.

18. The multilayer sliding member according to claim 17, wherein said resin layer further contains 1 to 15 vol % of tetrafluoroethylene-fluoroalkyl vinyl ether copolymer resin.

19. The multilayer sliding member according to claim 18, wherein said resin layer further contains 1 to 10 vol % of graphite and/or molybdenum disulfide.

20. The multilayer sliding member according to claim 17, wherein said resin layer further contains 1 to 10 vol % of graphite and/or molybdenum disulfide.

* * * * *